United States Patent [19]

Pitsch et al.

[11] Patent Number: 4,819,541
[45] Date of Patent: Apr. 11, 1989

[54] CONTROL OF A DOUBLE-ACTION PNEUMATIC DRIVE

[75] Inventors: Franz F. Pitsch, Moerfelden-Walldorf; Hans E. Winkelmann, Roedermark; Helmut W. Frohnheiser, Obertshausen; Guenther Herbert, Dreieich, all of Fed. Rep. of Germany

[73] Assignees: Lothar Schmitt GmbH, Dreieich; Hans E. Winkelmann GmbH, Roedermark, both of Fed. Rep. of Germany

[21] Appl. No.: 837,596

[22] Filed: Mar. 7, 1986

[30] Foreign Application Priority Data

Mar. 8, 1985 [DE] Fed. Rep. of Germany ....... 3508277

[51] Int. Cl.⁴ .................... F01B 25/02; F15B 11/08
[52] U.S. Cl. ........................................... 91/6; 91/16; 91/421; 91/463

[58] Field of Search ............... 91/6, 16, 421, 463

[56] References Cited

U.S. PATENT DOCUMENTS 4,107,923  8/1978  Budzich ................... 91/421 X
4,606,257  8/1986  Pfister ......................... 91/6 X
4,610,193  9/1986  Barker et al. ............. 91/463 X Primary Examiner—30en M. Ostrager
Attorney, Agent, or Firm—Ralf H. Siegemund

[57] ABSTRACT

The drive is controlled such that reduced pressure is applied during a forward motion phase and venting flow from the drive is used as dynamic control pressure to hold off application of full driving pressure until, through physical impediment, piston movement stops. This way rebounding is prevented and strong holding pressure (e.g. on welding electrodes) is made available after a low power motion phase.

3 Claims, 1 Drawing Sheet

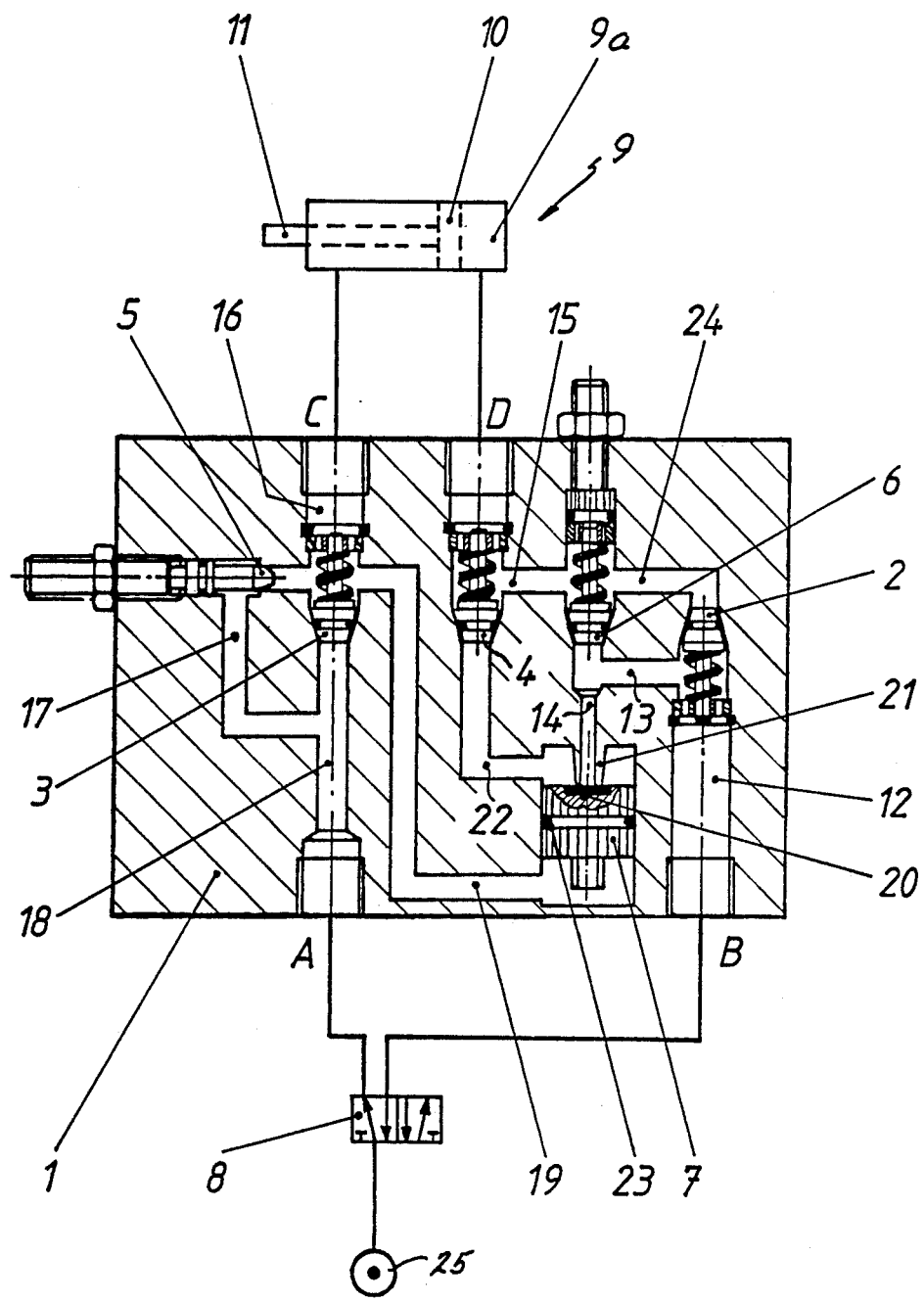

CONTROL OF A DOUBLE-ACTION PNEUMATIC DRIVE

BACKGROUND OF THE INVENTION

The present invention relates to an apparatus for controlling the movement of a piston wherein a double-action pneumatic piston-cylinder drive is provided, for example, for (mechanically actuating welding electrode holders for electrical resistance spot welding.

Generally speaking pneumatic devices of the type to which the invention pertains, are known, whereby a particular operating pressure acts on the piston movable being within a pneumatic cylinder, whereupon the electrodes of a dot welding device are moved toward each other within a particular welding cycle. As the electrodes hit the work piece a certain rebounding occurs on impact. Moroever, the impact produces noise generally but acts also as an parasitic load on the bearing of the various movable parts. This, in turn, leads to a premature wear of the electrodes, and may even result in deformation of the work pieces.

It is known for purposes of reducing the rebounding effect to provide a multi-stage pneumatic cylinder arrangement wherein the stages are telescoped in some fashion, they may be attenuated by means of air or oil. These two features for solving the problem, however, have the disadvantage that the cylinders and the pneumatic drive generally becomes quite expensive and often do not meet standardized specification requirements. Moreover, it is often necessary particularly in the latter case, to provide unique construction aspects separately in each instance.

DESCRIPTION OF THE INVENTION

It is an object of the present invention to improve pneumatic weld electrode actuating drives such that rebounding is avoided but even conventional double action pneumatic piston cylinder drives can be used, merely being supplemented, in accordance with the feature of the present invention.

In accordance with the preferred embodiment of the present invention, it is suggested to provide means for reducing the effective pressure in the cylinder below regular operating pressure and corresponding to a particular adjustable speed by means of which the electrodes are to be moved towards each other, and that upon stopping of the piston, at any place, in its potential range of displacement the operating pressure is automatically increased to the regular or normal operating pressure. Basically, a certain dynamic pressure is generated in the control structure that is maintained as long as the piston moves and this dynamic pressure is used for controlling the reduction in piston operating pressure. If the piston is halted (physically, for any reason) the dynamic pressure collapses, so does the reduction and full operating pressure acts on the piston.

The advantage obtained with the invention is to be seen particularly by the fact that the control structure provided and suggested in accordance with the invention can be used in conjunction with all kinds of welding machines and double action pneumatic cylinders, including particularly those that follow standardized specifications, and including equipment that is already installed and in use. It is merely necessary to insert, so to speak, the inventive control device in the conduit path between a usually provided 5/2 path pneumatic valve and the drive itself. The adjustability provided for the equipment as a whole is particularly included within the control device to be inserted and that adjustability permits matching of the control device to any kind of the conventional double action pneumatic piston cylinder drive.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

The FIGURE illustrates in cross-section a control device in accordance with the preferred embodiment of the present invention for practicing the best mode thereof.

Proceeding now to the detailed description of the drawings, the FIGURE illustrates a block basically element 1 which can be regarded to constitute the basic control device in accordance with the invention and to be constructed as a multiple valve element. It includes three check valves, 2, 3, and 4, one adjustable throttle valve 5, one adjustable differential pressure valve 6, and one differential a real valve 7. These valves are interconnected to be explained in detail below, and/or connected to the external connection points A, B, C, and D, through a plurality of ducts also to be identified more fully below.

The connecting points A and B are provided as input to the control structure and are accordingly connected to a somewhat schematically illustrated 5-2 way pneumatic valve 8. This valve 8 is conventional and, as mentioned earlier, is always provided, or at least its equivalent, is common in welding control equipment of the type to which the invention pertains.

Connection point C and D are the outputs of the inventive control device and they are connected to opposite ends or chamber portions of a double action pneumatic piston cylinder drive 9, having a cylinder chamber 9a in which is movably disposed a piston 10 having a piston rod 11. The electrodes to be moved are drivingly connected to that rod 11 in a manner known per se, and are not illustrated. The rod 11 provides for movement of these electrodes toward each other or away from each other depending upon the direction of movement of the piston 10 and the piston rod 11.

The FIGURE illustrates the valve 8 in a position of pressure source 25 is applied through connection A, duct 18, forwards and held in position in which the rod 11 is fully retracted. In order to cause piston rod 11 to protract, valve 8 changes in position so that full pressure is applied to the connection B while connection A receives external normal venting pressure.

The connection B leads to the duct 12 which continues in a duct 24, there being the check valve 2 interposed. A branch 18 leads from the check valve 2, the connection running in addition to a duct 14. If the pressure in duct 13 exceeds a particular pressure value, then the adjustable force of the closing spring of the differential pressure valve 6 is exceeded, and the valve 6 opens, to admit air from branch duct 13 into the channel or duct 15 until the spring force of the differential valve 6 can overcome the pressure in duct 13 and valve 6 recloses. This means that the duct 15 is pressurized at a level that is significantly below the pressure in ducts 12 and 18. The pressure as it is developed in the duct 15 is now caused to bypass the still closed valve 4, and is extracted at connection D to reach the right-hand chamber of the cylinder 9. Consequently the piston 10 is advanced at a reduced pressure, and, therefore, comparatively slowly.

A through-connection C-to-A within the valve block is concurrently provided for venting the left-hand cylinder chamber, but this venting path does not run through the fully closed check valve 3. Rather, venting runs specifically from duct 16, into a lateral branch from the closed check valve 3, the adjustable throttle valve 5, and the ducts 17 and 18. Thus, the venting is not simply made subject to atmospheric pressure but, depending on the adjustment of the throttle valve 5, ducts 16 and 19 are under a more or less developed dynamic pressure above atmospheric pressure. This dynamic pressure is used for control purposes; it acts on the relatively large surface of the differential areal valve 7, which was closed during the preceding welding cycle. This dynamic pressure, therefore, forces the sealing plate 20 onto the valve seat 21. This way, operating pressure in channel 14 is kept from the duct 22 and, therefore, from the check valve 4. Any tendency towards pressure equalization between the duct 19 and 22 will, in fact, be prevented by the sealing ring 23 of the differential areal valve 7.

If now the piston rod 11 generally, or more accurataly, any of the elements whose motion is controlled by the piston rod 11, hits against any work piece or, generally speaking, any kind of impediment during the displacement of the piston 10, then a resistance is obtained as far as movement of the piston rod 11 and the piston 10 is concerned, which exceeds the operating pressure as it is effective in the right-hand chamber of cylinder 9, which means that the piston 10, and therefore, the piston rod 11, will stop. This stopping, of course, causes the dynamic pressure in the duct 16 and 19 to collapse, and the operating pressure in channel or duct 14 causes the differential areal valve 7 to open. This, in turn means that now full operatin pressure from source 2 can be applied throuh ducts 14 and into duct 22, the check valve 4 thus opens and the full opening pressure is effective in connection D and the pneumatic cylinder 9 (right hand side). Full operating pressure becomes now effective on the piston after it has stopped, which means that the force exerted pneumatically upon this piston 10 is more or less drastically increased. This will not entail any movement of the piston (and of the electrodes) but will be effective as a strong holding pressure which the electrodes exerts upon the work pieces, which, of course, is an important feature of resistance welding.

On the other hand, it ca readily be seen that the operation of the device clearly avoids rebounding because as soon as the electrodes physically reach the potential stopping position, they do so at a relatively low pressure. Therefore, the electrodes are not forced against the work pieces but just move against them, and when meeting the work piece the electrodes just stop and will not rebound. Full operating pressure, i.e. the electrode holding pressure during welding, is applied only after the electrodes have, in fact, come to a complete stop and then, of course, rebounding can no longer occur.

In order to retract piston rod 11 and piston 10, valve 8 is switched to the position shown in the FIGURE. This now means that full operating pressure is applied to the connection A while connection B is vented. The operating pressure in channel or duct 18 is now effective to open the check valve 3 and that pressure will be applied directly to the connection C, and therefore, to the left-hand cylinder chamber. Full operating pressure from the start will cause high pressure actuation for the retraction of the piston rod 11 and of the electrodes from each other. The operating pressure, moreover, is effective through the channel 19 at the differential areal valve 7 and closes the same against external pressure as it exists in channels 14 and 13.

The air is vented from the right-hand chamber of cylinder 9 and fed through connection D and a branch of the closed check valve 4, into the channel 15, and from there through a branch of the closed differential pressure valve 6, into the duct 24, so as to open the check valve 2, and air can therefor discharge from the connection B and, of course, through the valve 8 to the outside atmosphere.

The construction as illustrated as well as the operation as described makes it quite clear that this particular control device can be simply inserted in an existing connection being the pair of drive connections C, D on one hand, and a pair of valve connections A, B on the other hand, or to put it differently, it is inserted in between the two path connections between the cylindre drive 9 on one hand and the two outputs of the multiple valve 8 on the other hand. It can also be seen that the inventive apparatus as described is provided primarily for purposes of insertion into a machine for resistance spot welding, whereby, generally speaking, in a first phase of an operation a relatively slow and, therefore, rebound motion is obtained followed by the generation of a higher force to hold the electrodes in position. This principle can be applied, however, elsewhere in all those cases wherein a double action pneumatic cylinder first provides operation at an adjustable lower pressure to obtain a particular speed, stops at any position during the displacement and can then develop full force, rebound-free and rather suddenly as that final position is obtained.

The invention is not limited to the embodiments described above, but all changes and modifications thereof, not constituting departures from the spirit and scope of the invention, are intended to be included.

We claim:

1. An apparatus for purposes of controlling the movement of a piston within a cylinder of a double action pneumatic drive, comprising:
   means connected for reducing externally applied pressure for obtaining relatively slowly moving said piston; and
   means included in said drive and being responsive to stopping of said piston during displacement on account of an impediment, for obtaining full operating pressure to be applied to said piston so as to obtain a higher holding force than the force that was applied to and exerted by the piston during said motion phase.

2. An apparatus for purposes of controlling the movement of a piston within a cylinder of double-action pneumatic drive, comprising means connected for reducing externally applied pressure for obtaining relatively low movement of said piston;
   dynamic means responsive to venting flow from said cylinder and providing for a particular control pressure, holding a bypass closed as long as said venting flow continues but opening the bypass if said piston stops; and means connected to obtain full operating pressure through said bypass to said cylinder so as to obtain a higher holding force than the force that was applied to an exerted by the piston during said motion phase.

3. An apparatus for purposes of controlling the movement of a piston within a cylinder of a double action pneumatic drive, comprising:

a first check valve connected so that during a forward moving phase of said piston direct access of full operating pressure to the piston is blocked, said first check valve permitting full passage of venting air upon retraction of said piston;

an adjustable differential pressure valve provided for reducing the pressure as applied to the piston during said forward moving phase;

a second check valve connected to block during said forward moving phase, the venting air flow and upon retraction of said piston causes full operating pressure to be applied to the piston for obtaining a return phase opposite said first motion phase;

a differential areal valve operated by said second check valve as full operating pressure is applied to said piston during said reverse motion phase, to keep said areal valve closed;

an adjustable throttle valve for throttling the venting of air from the cylinder during said forward motion phase, thereby producing an adjustable dynamic pressure, maintaining said differential areal valve also in closed position during the forward motion phase, the throttle valve provided for determining the speed of the piston during the said forward motion phase; and a third check valve connected to provide full operating pressure to said cylinder at an end of the forward motion phase, said first motion phase being terminated so that the dynamic pressure collapses, causing said differential areal valve to open so that full operating pressure phase is now applied to the piston through said third check valve.

* * * * *